(12) United States Patent
Desset-Brethes et al.

(10) Patent No.: US 11,584,583 B2
(45) Date of Patent: *Feb. 21, 2023

(54) DISPENSING DEVICE

(71) Applicant: Phillips-Medisize A/S, Struer (DK)

(72) Inventors: Sabine Desset-Brethes, Attenschwiller (FR); Regis Frelon, Loerrach (DE); Stefan Hirsch, Lorrach (DE); Hans Jensen, Struer (DK); Esben Johansen, Struer (DK); Peter Mathiasen, Struer (DK); Jan Olesen, Struer (DK)

(73) Assignee: Phillips-Medisize A/S, Struer (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,083

(22) Filed: Sep. 16, 2020

(65) Prior Publication Data

US 2020/0407153 A1 Dec. 31, 2020

Related U.S. Application Data

(63) Continuation of application No. 16/385,279, filed on Apr. 16, 2019, now Pat. No. 10,781,031, which is a (Continued)

(30) Foreign Application Priority Data

May 11, 2012 (EP) .................................... 12167791

(51) Int. Cl.
*B65D 83/04* (2006.01)
*B65D 83/06* (2006.01)

(52) U.S. Cl.
CPC ........... *B65D 83/04* (2013.01); *B65D 83/049* (2013.01); *B65D 83/06* (2013.01)

(58) Field of Classification Search
CPC ...................................................... B65D 83/04
See application file for complete search history.

(56) References Cited

U.S. PATENT DOCUMENTS

| 4,179,041 A | 12/1979 | Chambon |
| 4,526,305 A | 7/1985 | Lykes |

(Continued)

FOREIGN PATENT DOCUMENTS

| CN | 201176305 Y | 1/2009 |
| EP | 0678503 B1 | 9/1999 |

(Continued)

OTHER PUBLICATIONS

Non-Final rejection received for U.S. Appl. No. 29/710,341, dated May 20, 2020, 8 pages.

*Primary Examiner* — Gene O Crawford
*Assistant Examiner* — Ayodeji T Ojofeitimi

(57) ABSTRACT

The invention relates to a dispensing device for metering and dispensing a predetermined number of multiparticulates from a container. The dispensing device comprises a chamber which includes an inlet through which multiparticulates can enter the chamber and an overflow through which multiparticulates can leave the chamber. There is also an outlet through which multiparticulates can be dispensed from the chamber. The chamber comprises a metering surface which includes at least one retaining portion. The, or each, of the retaining portions is configured to be able to releasably retain a single multiparticulate.

20 Claims, 6 Drawing Sheets

Related U.S. Application Data continuation of application No. 14/399,991, filed as application No. PCT/EP2013/059691 on May 9, 2013, now Pat. No. 10,294,010.

(56) References Cited

U.S. PATENT DOCUMENTS

| | | |
|---|---|---|
| 4,971,203 A | 11/1990 | Weinstein |
| 5,385,267 A | 1/1995 | Diamond et al. |
| 5,601,213 A * | 2/1997 | Daniello ............... G01F 11/261 222/456 |
| 5,873,493 A | 2/1999 | Robinson |
| D481,313 S | 10/2003 | Archer |
| D489,610 S | 5/2004 | Miceli et al. |
| 6,948,641 B1 | 9/2005 | Williams |
| D555,893 S | 11/2007 | Mulaw |
| D571,199 S | 6/2008 | Petrosino et al. |
| D573,460 S | 7/2008 | Kawaguchi et al. |
| D608,084 S | 1/2010 | Anson et al. |
| D625,911 S | 10/2010 | Lee et al. |
| D633,292 S | 3/2011 | Anson et al. |
| D637,806 S | 5/2011 | Anson et al. |
| D643,209 S | 8/2011 | Rein |
| D651,897 S | 1/2012 | Miceli et al. |
| D656,818 S | 4/2012 | Dunwoody |
| D661,185 S | 6/2012 | Battat |
| D691,054 S | 10/2013 | Olsson et al. |
| D696,958 S | 1/2014 | Rex |
| D701,763 S | 4/2014 | Chury |
| D711,739 S | 8/2014 | Preibe et al. |
| D799,958 S | 10/2017 | Butruille et al. |
| 9,815,611 B2 | 11/2017 | Reinhold et al. |
| D827,364 S | 9/2018 | Rummel et al. |
| D828,013 S | 9/2018 | Van Wijngaarden et al. |
| D828,014 S | 9/2018 | Van Wijngaarden et al. |
| D829,065 S | 9/2018 | Marantis et al. |
| 10,131,475 B2 | 11/2018 | Babineau |
| 10,144,574 B2 | 12/2018 | Williams |
| 10,159,627 B2 | 12/2018 | Milante |
| D842,105 S | 3/2019 | Willemstyn |
| 10,294,010 B2 * | 5/2019 | Desset-Brethes ....... G01F 11/24 |
| 10,358,272 B2 | 7/2019 | Brotzel et al. |
| 10,364,089 B2 | 7/2019 | Daniels, Jr. et al. |
| D855,309 S | 8/2019 | Patel et al. |
| D856,136 S | 8/2019 | Marshall et al. |
| D861,053 S | 9/2019 | Tally |
| D862,225 S | 10/2019 | Horn |
| 10,532,861 B2 | 1/2020 | Kimmel et al. |
| D876,186 S | 2/2020 | Marantis et al. |
| 10,569,937 B2 | 2/2020 | Giraud et al. |
| 10,610,456 B2 | 4/2020 | Gosselin et al. |
| 10,781,031 B2 * | 9/2020 | Desset-Brethes ..... G01F 11/003 |
| 2006/0124658 A1 | 6/2006 | Coe et al. |
| 2007/0000953 A1 | 1/2007 | Ranney |
| 2011/0049082 A1 | 3/2011 | Wu |
| 2014/0202978 A1 | 7/2014 | Hwang |

FOREIGN PATENT DOCUMENTS

| | | |
|---|---|---|
| JP | 3007525 U | 2/1995 |
| JP | 3007525 A | 10/1995 |
| JP | 2001151286 A | 6/2001 |
| JP | 2009202906 A | 9/2009 |
| WO | 95/13223 A1 | 5/1995 |

* cited by examiner

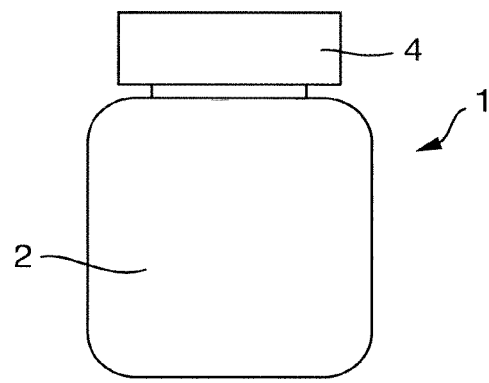
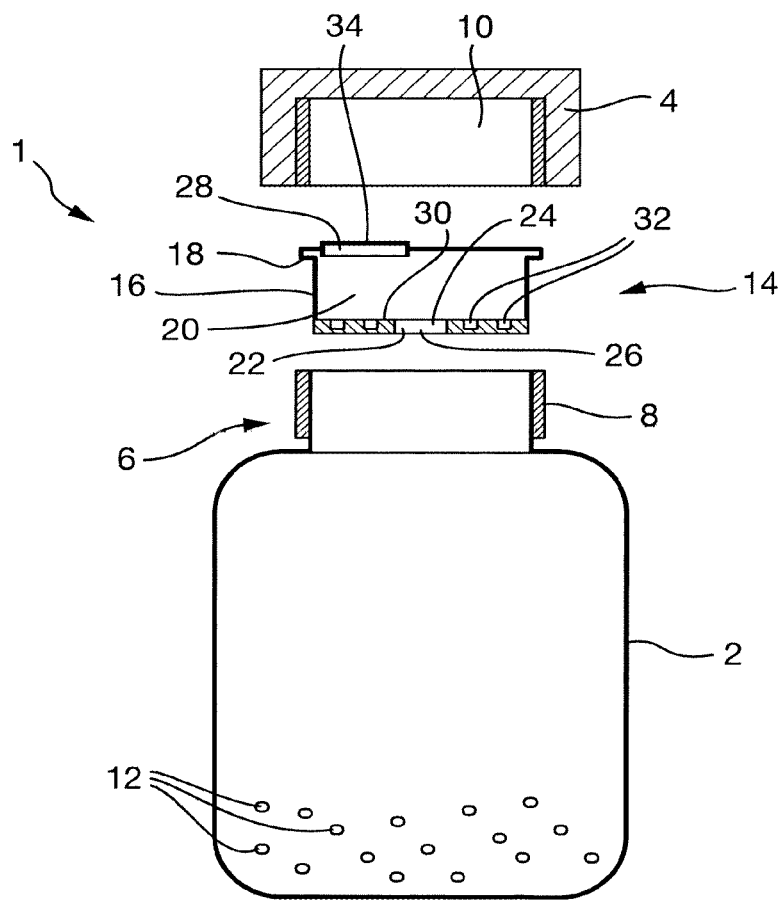

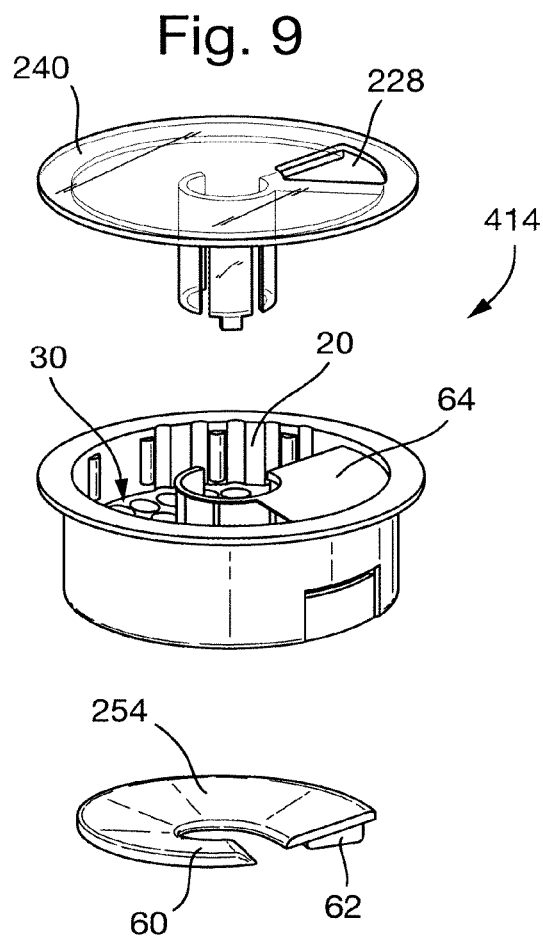
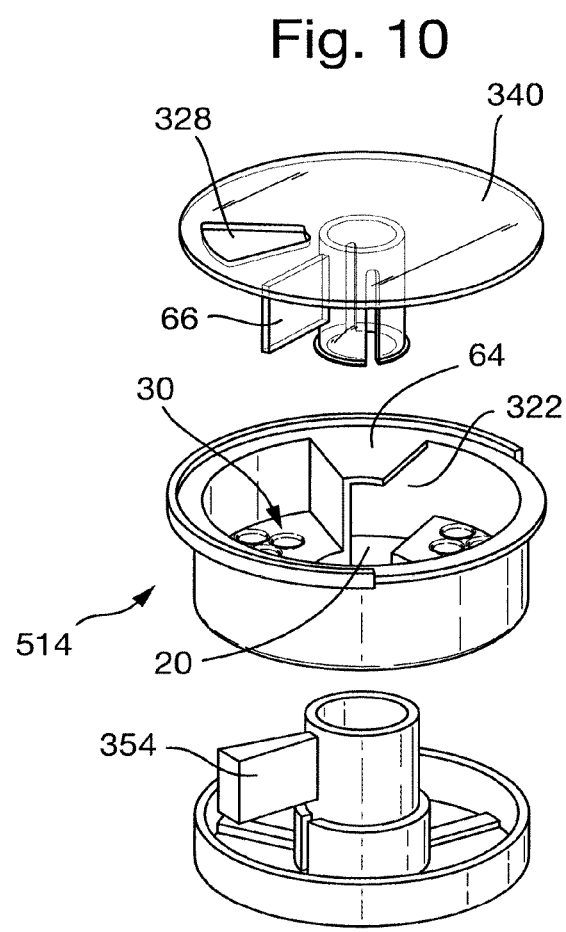

DISPENSING DEVICE

RELATED APPLICATIONS

This application claims priority to U.S. application Ser. No. 16/385,279, filed Apr. 16, 2019, which in turn claims priority to U.S. application Ser. No. 14/399,991, filed Nov. 10, 2014, which is a national phase of PCT Application No. PCT/EP2013/059691, filed on May 9, 2013, which further claims priority to European Application Serial No. 12167791.8, filed May 11, 2012, all of which are incorporated herein by reference in their entirety.

TECHNICAL FIELD

The present invention relates to a dispensing device for dispensing multiparticulates, for example minitablets, granules or pellets; particularly to a dispensing device able to dispense a user selectable number of such multiparticulates.

BACKGROUND ART

Multiparticulates are small solid dosage forms which have many advantages over conventional tablets. The small size of the multiparticulate means that they are easy to take, particularly for children and a single prescribed dose may comprise many multiparticulates. Since each multiparticulate may contain only a small amount of active ingredient it is possible, by varying the number and dose time prescribed to more closely control dosing and to personalise the dosage regimen.

However, the small size of the multiparticulates can create handling problems. In particular, it has been noted that counting the required number of multiparticulates has presented problems for some users. A common solution is to pour out more multiparticulates than needed and then manually return the excess to the container, but this can lead to contamination.

The invention provides a dispensing device for metering and dispensing a predetermined number of multiparticulates from a container, the dispensing device comprising a chamber, the chamber including an inlet through which multiparticulates can enter the chamber, an overflow through which multiparticulates can leave the chamber and an outlet through which multiparticulates can be dispensed from the chamber, the chamber comprising a metering surface, the metering surface including at least one retaining portion therein, the, or each, retaining portion configured to be able to releasably retain a predetermined number of multiparticulates.

SUMMARY

In this specification the term multiparticulates is used to encompass solid dosage forms whose diameter, or other maximum size dimension, is between 1 mm and 6 mm, for example between 1.5 mm and 5 mm or between 1.7 mm and 3.5 mm and which can be obtained by, for example, compression of a powder blend, granulation (wet or dry), extrusion or layering onto starter beads The term multiparticulate is intended to include any multiparticulate, granule or pellet that has a maximum dimension within the ranges above. A multiparticulate has a maximum dimension of Xmm it would fit within a sphere having a diameter of Xmm. A multiparticulate may comprise one or more pharmaceutically active component together with one or more pharmaceutically acceptable excipients. The pharmaceutically active component may comprise a renin inhibitor, for example those disclosed in EP0678503.

In one embodiment the dispensing device is intended to dispense a minitablet. A minitablet is a small tablet with a diameter, or other maximum dimension, of between about 1 mm and 6 mm, for example between 1.5 mm and 5 mm or between 1.7 mm and 3.5 mm.

By providing a device that is able to retain and subsequently dispense a predetermined number of multiparticulates the potential contamination issues that can arise with manual counting can be avoided. It should be noted that the predetermined number may not be a precise number but could be a number within certain tolerances. For example, the retaining portions could be adapted to retain a predetermined volume of multiparticulates, particularly if the multiparticulates are at the small end of the size range, and this predetermined volume would retain a predetermined number with a certain allowance for errors. It should be noted that, although the term multiparticulates (plural) is used herein, the retaining portions, or even the dispensing device may be adapted, or adaptable, to retain and subsequently dispense a single multiparticulate.

Providing a single retaining portion able to retain a predetermined number of multiparticulates provides an advantageous metering and dispensing device. In some embodiments a plurality of retaining portions are provided.

The container can be any suitable container, for example a bottle, jar, or pot. The container can be fabricated from any suitable material, for example a plastic material, a metal or a glass, or a combination of one or more of these, or other materials depending upon the desired physical and chemical properties of the container. For example, the container may be opaque to prevent light degradation of the contents and/or may be substantially water impermeable to better protect moisture sensitive contents. In some embodiments the container may be integrally formed with the dispensing device.

The dispensing device can be fabricated from any suitable material, for example a plastic material, a metal or a glass, or other material or a combination of one or more of these.

The chamber may be any suitable shape and may be substantially enclosed with the exception of the identified openings.

The inlet is arranged to permit multiparticulates from the container to enter the chamber, for example from a container containing multiparticulates. The inlet may be permanently open which simplifies the mechanical design of the device, or may be closed by a valve, flap or other seal which can be opened as required by a user. This enables the user to select when the container is coupled to the chamber via the inlet which means that the inlet can be positioned in any convenient location in the chamber without the risk that, once the chamber is full of multiparticulates, the multiparticulates may undesirably exit the chamber via the inlet rather than passing through the overflow.

The chamber includes a metering surface which includes retaining portions. The retaining portions are each arranged to releasably retain a predetermined number of multiparticulates. Each retaining portion may retain a single multiparticulate, may retain two multiparticulates, three multiparticulates or any other number. In some embodiments the retaining portions are adapted to retain a precise number of multiparticulates, but in others the number may include a tolerance, for example +/−20%, +/−10% or +/−5%. The metering surface may comprise a plurality of first retaining portions for retaining a first predetermined number of multiparticulates and a plurality of second retaining portions for retaining a second predetermined number of multiparticulates, wherein the first and second predetermined numbers are not the same. For example, the first predetermined number may be one and the second predetermined number may be two. Other embodiments may include a plurality of third and/or forth retaining portions each adapted to retain a different number of multiparticulates. In some embodiments first retaining portions may be provided which are adapted to retain a precise number of multiparticulates and second retaining portions may be provided which are adapted to retain a particular volume of multiparticulates. Such an arrangement could provide the ability for course and fine adjustment in doses.

Retaining portions can be achieved in a number of ways, for example a depression or cavity in the metering surface sized and configured to accept the predetermined number of multiparticulates. A bottom of such a cavity may be coloured to assist in visual checking to verify that the correct number of multiparticulates have been retained. It should be understood that the depression or cavity could be formed in many different ways, for example a hole through a first layer which is closed with a backing layer. The cavity or depression could take any suitable form, for example round or square cross section and may be tapered towards the open end or away from the open end. The axis along which the cavity extends from the metering surface may not be perpendicular to the metering surface as this would provide an enhanced retention of multiparticulates in one direction compared with an opposite direction.

In an embodiment in which retaining portions are provided by depression in the metering surface, when the dispensing device is arranged in a first orientation, in which the metering surface is facing upwards (against the direction of gravity), the predetermined number of multiparticulates can drop under gravity into each of the depressions and remain retained there until the device is arranged in a second orientation, in which the metering surface is facing downwards, the previously retained multiparticulates fall from the depressions. By filling each of the depressions with the predetermined number of multiparticulates and then causing the excess to leave the chamber via the overflow a predetermined number of multiparticulates are retained in the chamber. Such depression or cavity type retaining portions could be referred to as passive retaining portions which use gravity and device geometry to retain the predetermined number of multiparticulates and this could also be viewed as volumetric metering as the geometry of the cavity or depression together with the geometry of the multiparticulates and the way in which they pack together determined the number of multiparticulates that are retained. Such passive retaining portions might comprise recesses or cups and are simple to construct. However, it is possible that active retaining portions could be employed in the invention in which the retaining portions comprise one or more movable retainers which are adapted to capture a predetermined number of multiparticulates and release them on demand.

The overflow may be a separate opening into the chamber or may be the same opening as the inlet. In one embodiment the inlet and overflow both open into the container from which multiparticulates are to be dispensed. This allows multiparticulates to be metered for dispensing from the container and any excess returned to the container without a user having to touch the multiparticulates which reduces any risk of contamination. In one embodiment the overflow is coupled to a tube which, when the device is connected to a container extends into the container. By providing such an overflow tube the likelihood of multiparticulates accidentally passing into the chamber from the container via the overflow is reduced.

The outlet allows the dispensing of the retained multiparticulates, once released, from the dispensing device. The outlet may be releasably sealed with a movable cover so that, during the metering process the outlet from the chamber is closed but can be opened when the user wishes to dispense the multiparticulates. The outlet may be an opening in a roof of the device, the roof being movable between a position in which the opening is accessible to the chamber and one in which the opening is not accessible to the chamber.

In one embodiment the overflow is arranged in, or adjacent, the metering surface. This is particularly useful in an embodiment in which passive retaining portions, such as depressions, are used as it allows excess to be readily returned to the container without significant risk of accidentally releasing the retained multiparticulates.

In one embodiment the device includes at least one baffle. The, or each, baffle may be movable by a user relative to the metering surface to selectively block access to one or more of the retaining portions. The baffle may prevent multiparticulates from passing from the inlet to one or more of the retaining portions or may prevent a multiparticulate being retained by the retaining portion. For example, a movable baffle could be arranged within a depression, the baffle adapted to move into the depression so that the depression is no longer able to accept and retain a multiparticulate. In one embodiment a baffle could be removable from the depression to allow the depression to receive and retain one or more multiparticulates. Such removable baffles could be provided in sufficient quantity that a user could block all except one of the retaining portions, in another embodiment a movable baffle alters the size and/or shape of the chamber accessible from the inlet such that the area of metering surface accessible from the inlet is altered and therefore the number of retaining portions within the chamber is altered and thereby the maximum number of multiparticulates retained is altered.

The, or each, baffle may be movable by a user using a lever or other member accessible when the dispensing device is coupled to the container. In some embodiments the baffles may be pre-set before the dispensing device is coupled to a container. The pattern of retaining portions and/or the order in which the, or each, baffle blocks access to those retaining portions can be configured to ensure that a user is able to set doses appropriate to the multiparticulates being dispensed.

The dispensing device may additionally comprise means for coupling it to a container. For example such attachment means could include a screw coupling, internal or external, or the dispensing device may include an outer friction surface which is intended to provide a friction fit into an outlet from a container, for example a friction, or push, fit into the neck of a container.

In some embodiments the dispensing device may be releasably coupled to the container using a child resistant coupling. For example, the dispensing device may include a collar which can be screwed onto the container. Access to the outside of the collar may be substantially restricted by a circumferential skirt. The collar may be coupled to the dispensing device such that the collar is substantially freely rotatable relative to the collar in one direction of rotation, but not the other. This allows the collar of the dispensing device to be screwed onto the container by a user holding and turning the skirt, but not readily removed. The skirt may include user displaceable portions which, when displaced by a user, couple the skirt to the collar such that the collar is not freely rotatable relative to the skirt such that the collar can be unscrewed from the container. The displaceable portions may comprise one or more resiliantly biased portions that can be pressed substantially radially inwards towards the collar to couple the collar to the skirt as described.

In one embodiment there is only one retaining portion in the metering surface. In another that are more than 5 retaining portions in the metering surface, in another embodiment there are more than 10 and in another, more than 20. In these or other embodiment there may be less than 50 retaining portions in the metering surface, less than 40 or less than 30. In one embodiment there are between 20 and 30 retaining portions in the metering surface. In some embodiments different types or sizes of retaining portion might be used. By providing different retaining portions which may be adapted to retain one, two, three or more multiparticulates the number of multiparticulates metered for dispensing from the device can be adjusted as appropriate to the multiparticulates to be dispensed.

In another embodiment there are sufficient retaining portions to retain, in total, 1 multiparticulate in or on the metering surface. In another embodiment there are sufficient retaining portions to retain more than 5, or 10 and in another, more than 30. In these or other embodiment there may be sufficient retaining portions to retain less than 80 multiparticulates in or on the metering surface, less than 70 or less than 60. In one embodiment there are sufficient retaining portions to retain between 10 and 50 multiparticulates in or on the metering surface. The number of multiparticulates that can be retained does not directly correlate with the number of retaining portions as some or all of the retaining portions may be adapted to retain more than one multiparticulate.

The invention also provides a medicament storage device, the storage device comprising a container and a dispensing device, the dispensing device being as described above, the container having a storage portion for containing a plurality of multiparticulates and an container opening, a neck extending between the storage portion and the opening, the dispensing device being coupled to the opening such that multiparticulates must pass through the dispensing device to leave the container.

In one embodiment the medicament storage device further comprises a child resistant cap releasable coupled to a neck of the container and the dispensing device is arranged, at least partly, in the neck of the container. This allows a standard container and child proof cap to be used, while benefitting from the dispensing device.

The invention also provides a method of dispensing multiparticulates from a medicament storage device, the storage device comprising a container and a dispensing device, the dispensing device being as described above, the container having a storage portion for containing a plurality of multiparticulates and an container opening, a neck extending between the storage portion and the opening, the dispensing device being coupled to the opening such that multiparticulates must pass through the dispensing device to leave the container, the method comprising the steps of:
 i) manipulating the storage device to cause multiparticulates from the container to enter the chamber of the dispensing device through the inlet;
 ii) allowing the accessible retaining portions to each retain a predetermined number of multiparticulates;
 iii) manipulating the storage device to cause multiparticulates not retained in a retaining portion to exit the chamber of the dispensing device through the overflow and return to the container; and
 iv) releasing the retained multiparticulates and dispensing them through the outlet.

This process can be repeated as necessary if the total number of multiparticulates to be dispensed is greater than the maximum number of multiparticulates that can be retained by the retaining portions.

In one embodiment the manipulation of the storage device in step (i) comprises turning the storage device until the container is located above the dispensing device. In the same, or a different, embodiment the manipulation of the storage device in step (iii) comprises turning the storage device until the container is located below the dispensing device. In one or both of the previous embodiments, or a different embodiment, releasing the retained multiparticulates comprises tipping the storage device until the metering surface of the dispensing device is pointing downwards sufficiently such that multiparticulates retained in depressions in the metering surface are released and can leave the storage device.

The invention also provides a medicament container comprising a dispending apparatus as described above coupled thereto and a plurality of multiparticulates contained therein. The multiparticulates may include one or more pharmaceutically active ingredients, for example the multiparticulates may include valsartan or aliskiren.

It should be understood that throughout this specification and in the claims that follow, unless the context requires otherwise, the word "comprise", or variations such as "comprises" or "comprising", implies the inclusion of the stated integer or step, or group of integers or steps.

BRIEF DESCRIPTION OF DRAWINGS

The invention will now be further described, by way of example only, with reference to the following drawings in which:
FIG. 1 shows a medicament storage device;
FIG. 2 shows an exploded cross-section of the medicament storage device of FIG. 1;
FIGS. 9 and 10 show further embodiments dispensing devices.

DETAILED DESCRIPTION OF THE PREFERRED EMBODIMENTS

Figure 3:
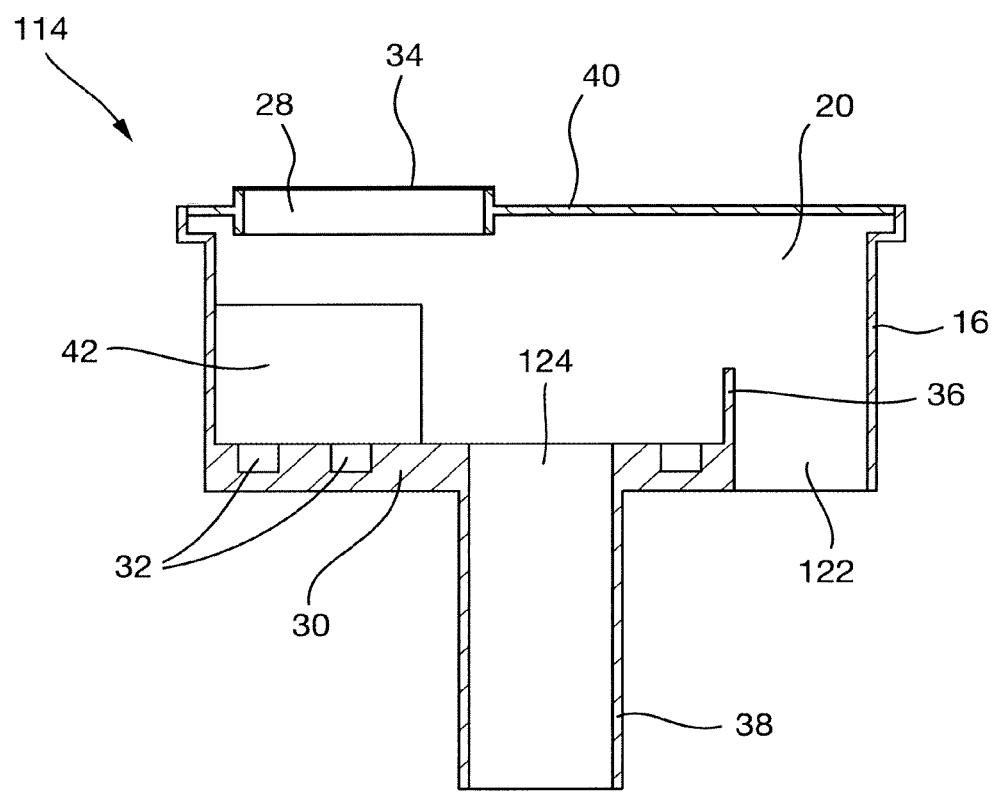
FIG. 3 shows a cross section view of a dispensing device.

FIG. 1 shows a medicament storage device 1 comprising a container 2 and a cap 4. In this case the cap 4 is a child resistant cap, for example a push and turn cap.

FIG. 2 shows an exploded cross-section of the medicament storage device 1 of FIG. 1. The container 2 includes a neck portion 6, the neck portion 6 includes an external screw thread 8 which, in use, cooperates with an internal screw thread 10 in the cap 4 to couple the cap 4 to the container 2. Multiparticulates 12 are located within the container 2, in this case the multiparticulates 12 are minitablets which comprise a renin inhibitor.

A dispensing device 14 is shown and the external surface 16 is a push fit into the neck 6 of the container 2 and is prevented from passing fully into the container 2 by a shoulder 18. When arranged in the neck 6 the dispensing device 14 prevents multiparticulates 12 from exiting the container 2 without passing through the dispensing device 14.

The dispensing device 14 is for metering and dispensing a predetermined number of multiparticulates 12 from the container 2. The dispensing device comprises a chamber 20 which includes an inlet 22 through which multiparticulates 12 can enter the chamber 20 and an overflow 24 through which multiparticulates can leave the chamber 20. In this case the inlet 22 and the overflow 24 are provided by the same opening 26 into the dispensing device 14, but they could be separate openings. The dispensing device 14 also includes an outlet 28 through which multiparticulates 12 can be dispensed from the chamber 20. The chamber 20 also includes a metering surface 30 which comprises a plurality of retaining portions 32. In this case each retaining portion 32 is configured to be able to releasably retain a single multiparticulate 12, but in other embodiments it should be understood that the retaining portions may be adapted to retain two, three or more multiparticulates. In this case the retaining portions 32 are depressions in the metering surface. In this example the outlet 28 is releasably sealed by a cover 34.

FIG. 3 shows a different embodiment of a dispensing device 114. Items that have the same function as described above will be referenced with the same numeral.

In this embodiment the inlet 122 and overflow 124 are separate openings into the chamber 20. The inlet 122 includes an inlet wall 36 that extends into the chamber 20 to hinder multiparticulates 12 from returning to the container through the inlet 122. The overflow 124 includes an overflow tube 38 that extends, in use, into the container 2. The overflow tube 38 hinders multiparticulates 12 entering the chamber via the overflow 124. These features associated with the inlet 122 and overflow 124 facilitate handling of the dispensing device 114.

The outer wall 16 and the metering surface 30 define the chamber 20 together with a roof 40 through which the outlet 26 passes. The roof 40 is transparent to allow a user to visually confirm that, during a priming phase of use, each of the retaining portions 32 has releasably retained a multiparticulate 12 prior to a dispensing phase.

The dispensing device 114 also includes a user adjustable barrier 42. The barrier 42 can be adjusted, during a setting phase of use, by a user so as to prevent some of the retaining portions 32 from being accessible to multiparticulates 12 in the chamber 20. The barrier 42 could also be used to alter the shape of the chamber 20 to prevent the retaining portions 32 from reached by a multiparticulate 12.

Figure 4:
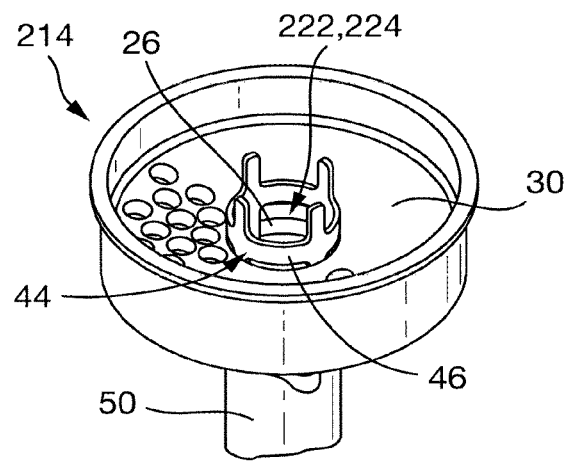
FIGS. 4 and 5 show an embodiment of a dispensing device using a valve.
Figure 5:
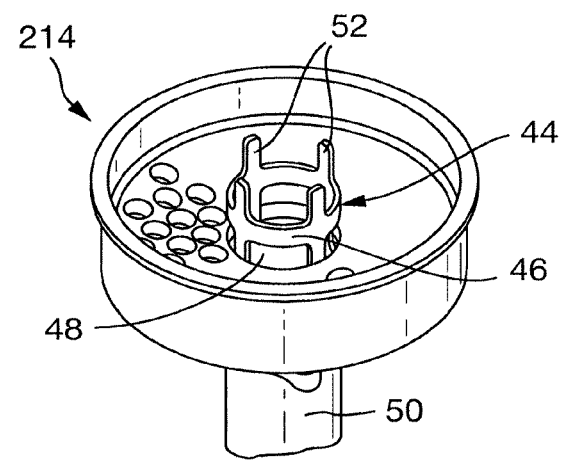

FIGS. 4 and 5 show an embodiment of a dispensing device 214 using a valve arrangement. Not shown in these figures is a cover or roof for the dispensing device. The cap 4 could serve this purpose, or an additional part (not shown) could be used. In this dispensing device 214 the inlet and overflow 222, 224 are provided by the same opening through the metering surface 30. In a FIG. 4 a valve 44 is arranged to provide a wall 46 which surrounds the inlet/outlet opening 26 adjacent the metering surface 30. The wall 46 does not prevent multiparticulates 12 from entering the chamber through the inlet 222, but it does restrict the passage of multiparticulates to the overflow 224. This facilitates manipulation of the dispensing device 214 to ensure that each of the depressions, which form the retaining portions 32, contains, and is able to retain, a multiparticulate 12.

In FIG. 5 the valve 44 has been opened by moving the wail 46 into the chamber to expose openings 48. In this case the valve 44 comprises a tube 50 which is movable through the opening 26. The tube 50 comprises openings 48 which in a first valve position are arranged outside the chamber 20 adjacent the outside of the metering surface 30. In such a configuration multiparticulates are able to pass from the container 2, through the openings 48 and into the tube 50 and thereby into the chamber 20 when the medicament storage device 1 is inverted. When the medicament storage device 1 is arranged neck upward, the multiparticulates are retained in the chamber by the wall 46.

In a second valve position the openings are arranged inside the chamber 20 adjacent the metering surface 30. In such a configuration multiparticulates are able to pass from the chamber 20, through the openings 48 and into the tube 50 and thereby into the container 2 when the medicament storage device 1 is arranged neck up. When the medicament storage device 1 is inverted, the multiparticulates are hindered from entering the chamber 20 by the tube 50.

The valve 44 could be biased to either the first or second position by a spring or other resiliently deformable member. The valve 44 may be manually movable by a user, or may be moved automatically, for example the tube 50 may include risers 52 which contact the cap 4 when the cap is in place which forces the valve 44 into the first position. When the cap 4 is removed the valve may be biased to the second position.

Figure 6:
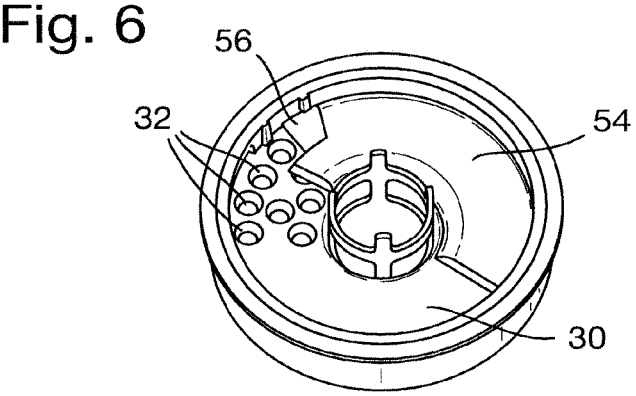
FIG. 6 shows a modified version of the dispensing device of FIGS. 4 and 5.

FIG. 6 shows the dispensing device 214 of FIGS. 4 and 5, but with a baffle 54 which is movable by a user to selectively block access to one or more of the retaining portions 32. This enables a user to pre-select how many multiparticulates 12 will be retained and then subsequently dispensed from the dispensing device 214. In this case the baffle 54 is arranged adjacent the metering surface 30 and prevents multiparticulates within the chamber 20 from entering the depressions that form the retaining portions 32.

The baffle 54 may be a single movable member, or could include additional movable parts, for example a movable extension 56 which is adapted and arranged to permit a single retaining portion 32 to be exposed or covered allowing for precise control over the number of retaining portions 32 available.

Figure 7:
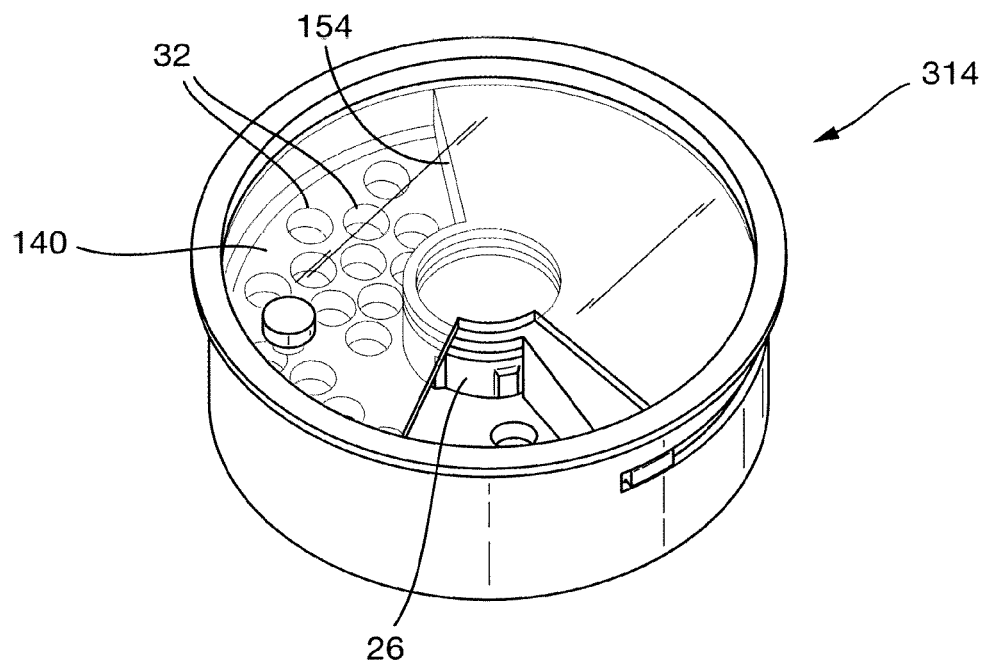
FIGS. 7 and 8 show a further embodiment of a dispensing device which includes a transparent cover.
Figure 8:
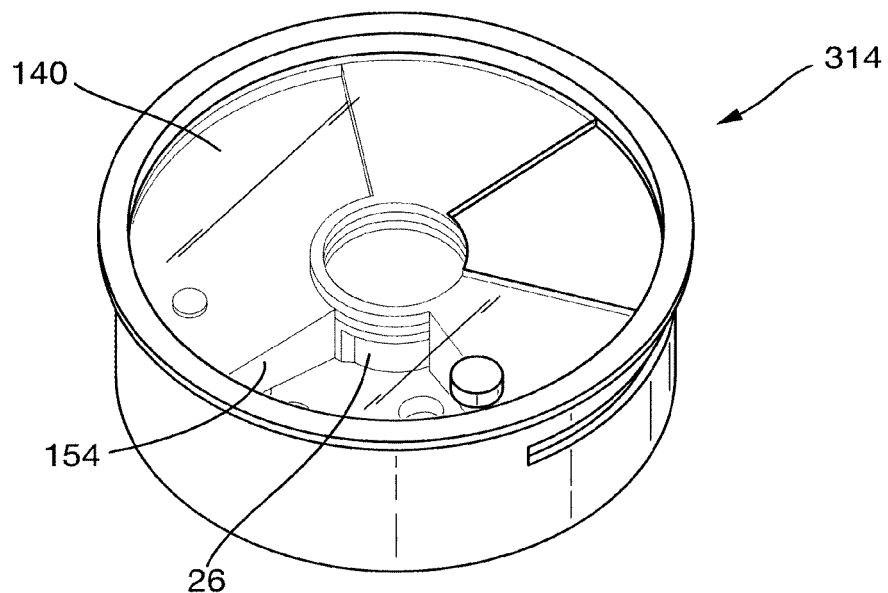

FIGS. 7 and 8 show a further embodiment of a dispensing device 314 in which the dispensing device includes a movable baffle 154 which is adapted to alter the size of the chamber and thereby selectively prevent access to one or more retaining portions 32.

A single opening 26 provides both the inlet 22 and overflow 24 into and from the chamber 20. There is a transparent roof 140 which includes an aperture which provides the outlet 26. The roof 140 is rotatable between a position in which the outlet 28 is not accessible from the chamber 20 and one in which the outlet 28 is accessible from the chamber 20 such that multiparticulates can be dispensed from the dispensing device 314.

FIG. 9 shows an exploded view of an embodiment of a dispensing device 414 in which the baffle 254 is arranged as a spiral which is inserted into a track beneath the metering surface 30. A first end 60 of the baffle is arranged within the chamber and the baffle 254 is movable such that the first end extends further into the chamber and thereby prevents access to a greater proportion of the metering surface 30. By preventing access to more of the metering surface, access to retaining portions is prevented. By adjusting how much of the baffle 254 extends into the chamber the number of available retaining portions can be adjusted. A tab 62 is provided on the baffle to facilitate user manipulation. A scale can be provided within the chamber or underneath the dispensing device to provide an indication of the number of multiparticulates that will be retained for a given position of the baffle 254. There may be one or more predetermined positions for the baffle 254 corresponding to desired numbers of multiparticulates. The roof 240 includes an outlet 228 and the roof is movable between a position in which the outlet 228 is sealed by a baffle 64 and a position in which the outlet 228 is accessible from the chamber 20.

FIG. 10 shows an exploded view of a further embodiment of a dispensing device 514 in which a movable baffle 354 is movable within the chamber 20 to prevent multiparticulates from passing from the inlet 322 to at least some of the retaining portions. The closer the baffle is moved to the inlet 322 the fewer retaining portions are accessible, so the position of the baffle 354 determined the number of multiparticulates that are able to be retained and subsequently dispensed from the device. A wiper 66 is provided, in this case coupled to the roof 340. The wiper 66 is adapted to sweep along the metering surface 30 after filling to move excess, non-retained, multiparticulates to the outlet to facilitate the metering, or priming, step. In this embodiment 514 the wiper 66 can be used to close the inlet 322 during a dispensing phase so that accidental dispensing of multiparticulates that were not previously retained in a retaining portion can be avoided.

In use the container 2 contains multiparticulates 12 to be dispensed. The dispensing device 14 is arranged in the neck, or outlet, from the container 2 such that multiparticulates must pass through the dispensing device 14 to exit the container 2. The dispensing device 14 is pre-set (before or after being arranged in the neck of the container 2) so that only a predetermined number of retaining portions 32 are accessible. The pre-setting could be that only the predetermined number of retaining portions 32 are provided, or that a baffle 54 is moved to leave only predetermined number of retaining portions 32 accessible. More than one baffle could be provided to selectively block access to one or more retaining portions.

The storage device 1 is manipulated, for example by inverting, so that multiparticulates from within the container can pass through the inlet 22 into the chamber 20, thereby charging the chamber 20 with multiparticulates 12.

The storage device 1 is then manipulated again, for example by returning to the neck upwards orientation and shaking or tapping, so that multiparticulates within the chamber 20 fall into the depressions 32 in the metering surface 30. Since the depressions forming the retaining portions are configured to accept and retain a predetermined number of multiparticulates 12, excess multiparticulates 12 are free to move within the chamber 20 and can pass through the overflow 24 to return to the container.

This metering action leaves the dispensing device 1 retaining only a predetermined number of multiparticulates 12. If the roof 40 is transparent a user can visually check that each retaining portion 32 has successfully retained the correct number of multiparticulates 12 before moving to the dispensing stage.

The outlet 28 can then be opened and the retained multiparticulates 12 dispensed from the dispensing device 1 by tipping the device away from the neck upwards orientation, but not so far that further multiparticulates 12 are able to pass into the chamber 20 from the container 2. As noted above the particular geometry of inlet, overflow, outlet and retaining portion type can be optimised to facilitate handling.

Figure 11:
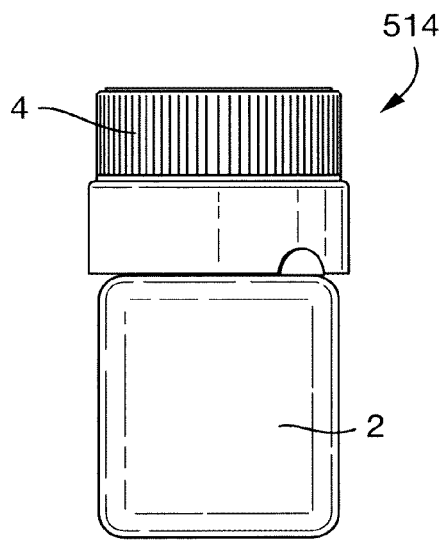
FIGS. 11, 12 and 13 show yet another embodiment of the invention.
Figure 12:
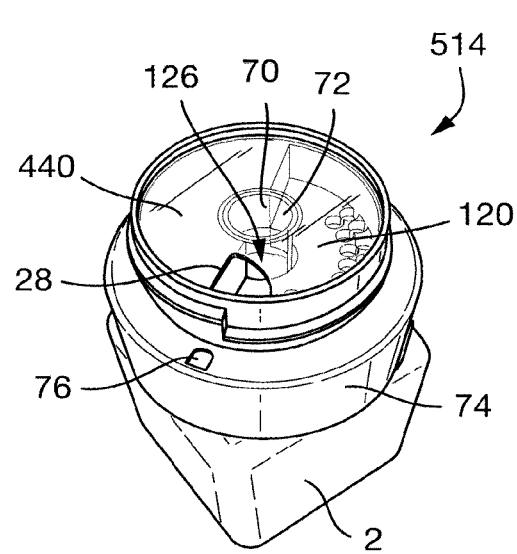
Figure 13:
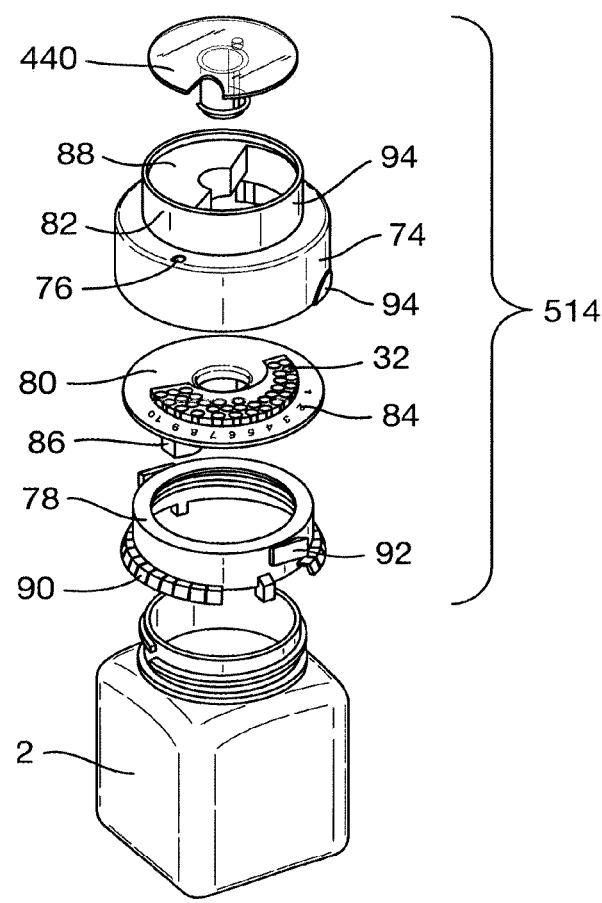

FIGS. 11, 12 and 13 show yet another embodiment of a dispensing device 514, FIG. 11 shows the dispensing device 514 coupled to a container 2 and with a cap 4 covering the top. The cap 4 may be a child resistant cap as in FIG. 1.

FIG. 12 shows a perspective view of the dispensing device 514 and container 2 with the cap 4 removed. The dispensing device 514 is similar to that shown in FIGS. 7 and 8 in that a central opening 126 provide the inlet and overflow from the chamber 120. A roof 440, in this case transparent, includes an aperture which provides the outlet 28. The roof is coupled to a central cylindrical baffle 70 that extends into the opening 126. The baffle includes a radial aperture 72 through which multiparticulates pass to enter the chamber 120. The dispenser 514 includes a skirt 74 and a dose window 76 through which an indication of the selected dose can be viewed by a user.

FIG. 13 shows an exploded diagram of the parts of the dispensing device 514. The parts are the collar 78, the metering floor 80 which comprises the metering surface, the body 82 and the roof 440.

The metering floor 80 includes retaining portions 32 and is adapted to be mounted inside the body 82 such that the metering surface forms the floor of the chamber 120. Lugs 86 are provided on the underside of the metering floor 80 to facilitate rotation of the metering floor relative to the body 82. The body includes a baffle 88 which, when the dispensing device is assembled, extends over at least some of the metering floor 80. The pattern of retaining portions 32 on the metering floor 80 being such that rotation of the metering floor 80 relative to the body 82 results in a selectable number of retaining portions 32 being accessible in the chamber 120. The metering floor 80 including an indicator portion 84 including indicia which are visible through the dose window 76 and are indicative of the number of retaining portions accessible in the chamber 120.

The body 82 includes a substantially cylindrical skirt portion 74 into which the collar 78 fits and is retained by snap fit fingers 90 on the collar 78. The collar 78 is substantially freely rotatable relative to the body 82 In one direction, but not the other due to a ratchet mechanism 92. Compressible portions 94 of the skirt 74 allow a user to couple the collar to the skirt to substantially prevent rotation of the collar 78 relative to the body 82 and thereby allow the collar 78 to be unscrewed from the container 2.

In use, the desired dose is set by rotating the metering floor 80 relative to the body 82 using the lugs 86 until the desired number of retaining portions 32 remains available within the chamber 120. The dose window 76 allows a user to view the appropriate indicia 84 indicative of the selected dose. The dispensing device 514 is then screwed to the container 2.

The roof 440 is rotated such that the outlet 28 is closed and the radial aperture 72 permits multiparticulates to pass from the container 2 into the chamber 120. The container 2 and dispensing device 514 are then manipulated to cause multiparticulates to enter the chamber 120. The container 2 and dispensing device 514 are then further manipulated to cause multiparticulates to be retained in each of the retaining portions 32 and the excess to return to the container 2. The roof 440 can then be moved to open the outlet 28 and allow the retained multiparticulates to be dispensed from the dispensing device 514. After use, the cap 4 can be screwed onto the body using threaded projection 94. It is preferred that the threaded projection 94 and the threaded portion of the container 2 accept the same cap 4 allowing the cap to be used with the container 2 alone, or the dispensing device 514 attached to the container 2.

It should be understood that the invention has been described above by way of example only and that modifications in detail can be made without departing from the scope of the claims.

The invention claimed is:

1. A dispensing device which is configured to be operatively connected to a container storing a plurality of multiparticulates, the dispensing device comprising:
   a chamber comprising a metering surface, the metering surface including a plurality of retaining portions therein;
   at least one baffle provided in the chamber, the at least one baffle configured to be operable to allow a select number of the plurality of retaining portions to be accessible;
   an inlet which is configured to allow multiparticulates from the chamber to move into the chamber, thereby allowing multiparticulates to be retained in respective ones of the accessible retaining portions; and
   an outlet which is configured to allow for removal of the multiparticulates that were retained in the accessible retaining portions.

2. The dispensing device as defined in claim 1, configured to have a cap operatively connected thereto, whereby the dispensing device is configured to be positioned between the container and the cap when the dispensing device is operatively coupled to both the container and the cap.

3. The dispensing device as defined in claim 1, wherein the at least one baffle is operable to allow a select number of the plurality of retaining portions to be accessible prior to the dispensing device being operatively connected to the container.

4. The dispensing device as defined in claim 1, further comprising a transparent roof, wherein the select number of the plurality of retaining portions to be accessible in the chamber is visible via the transparent roof.

5. The dispensing device as defined in claim 1, wherein the outlet is different from the inlet.

6. The dispensing device as defined in claim 1, wherein the at least one baffle is configured to be operable to prevent a select number of the plurality of retaining portions to be accessible.

7. The dispensing device as defined in claim 1, wherein the at least one baffle is configured to rotate to allow the select number of the plurality of retaining portions to be accessible.

8. The dispensing device as defined in claim 1, further comprising an overflow which is configured to allow multiparticulates that moved into the chamber to return to the container.

9. The dispensing device as defined in claim 8, wherein the inlet and the overflow are the same.

10. The dispensing device as defined in claim 9, wherein the outlet is different from the inlet and the overflow.

11. The dispensing device as defined in claim 8, wherein the inlet and the overflow are different.

12. The dispensing device as defined in claim 11, wherein the outlet is different from the overflow.

13. The dispensing device as defined in claim 1, further comprising a plurality of numbered indicia which correspond to a number of the plurality of retaining portions provided in the metering surface, wherein one of the plurality of numbered indicia which corresponds to the select number of the plurality of retaining portions to be accessible in the chamber is visible from an exterior of the dispensing device.

14. The dispensing device as defined in claim 13, further comprising a window, wherein the one of the plurality of numbered indicia which corresponds to the select number of the plurality of retaining portions to be accessible in the chamber is visible via the window.

15. The dispensing device as defined in claim 13, wherein the plurality of numbered indicia are provided on the metering surface.

16. A method of dispensing multiparticulates from a container storing a plurality of multiparticulates, the method comprising:
   a) providing a dispensing device comprising a chamber, the chamber comprising a metering surface, the metering surface including a plurality of retaining portions therein;
   b) determining a number of multiparticulates to be dispensed from the container;
   c) manipulating the dispensing device to cause a select number of the plurality of retaining portions to be accessible in the chamber, wherein the select number of the plurality of retaining portions equals the determined number of mulitparticulates to be dispensed from the container;
   d) operatively connecting the dispensing device to the container;
   e) causing multiparticulates from the container to move into the chamber of the dispensing device until each accessible retaining portion within the chamber is retaining a respective multiparticulate;
   f) if applicable, causing any multiparticulates that moved into the chamber, but which are not retained in an accessible retaining portion, to return to the container; and
   g) removing the multiparticulates that are retained in the accessible retaining portions from the dispensing device.

17. The method as defined in claim 16, wherein step c) is performed before step d).

18. The method as defined in claim 16, wherein the dispensing device further comprises at least one baffle provided in the chamber, and wherein step c) comprises manipulating the at least one baffle to cause the select number of the plurality of retaining portions to be accessible in the chamber.

19. The method as defined in claim 16, wherein step g) can be performed without disconnecting the dispensing device from the container.

20. A method of preparing a medicament storage device used for dispensing multiparticulates, the method comprising:
   a) providing a container storing a plurality of multiparticulates therein, the container having a cap operatively associated therewith which is configured to close off an opening of the container to contain the plurality of multiparticulates stored within the container;
   b) removing the cap from the container to open the opening of the container;
   c) providing a dispensing device having a chamber, the dispensing device configured to retain a select number of multiparticulates in the chamber;
   d) configuring the dispensing device to retain the select number of multiparticulates in the chamber;

e) operatively connecting the dispensing device to the container to allow the select number of multiparticulates to enter the chamber via the opening of the container; and f) securing the cap to the dispensing device to at least partially cover the chamber.

\* \* \* \* \*